(12) United States Patent
Kleven

(10) Patent No.: US 6,311,568 B1
(45) Date of Patent: Nov. 6, 2001

(54) PROCESS FLOW DEVICE WITH IMPROVED PRESSURE MEASUREMENT FEATURE

(75) Inventor: Lowell Kleven, Eden Prairie, MN (US)

(73) Assignee: Rosemount, Inc., Eden Prairie, MN (US)

( * ) Notice: Subject to any disclaimer, the term of this patent is extended or adjusted under 35 U.S.C. 154(b) by 0 days.

(21) Appl. No.: 09/394,728

(22) Filed: Sep. 13, 1999

(51) Int. Cl.[7] .................................................. G01F 1/34
(52) U.S. Cl. ...................................................... 73/861.42
(58) Field of Search ........................... 73/861.42–861.65

(56) References Cited

U.S. PATENT DOCUMENTS

| | | | |
|---|---|---|---|
| 2,943,640 | 7/1960 | James | 137/594 |
| 3,817,283 | 6/1974 | Hewson . | |
| 4,193,420 | 3/1980 | Hewson | 137/356 |
| 4,249,164 | 2/1981 | Tivy | 340/870.3 |
| 4,319,492 | 3/1982 | Hewson et al. | 73/756 |
| 4,466,290 | 8/1984 | Frick | 73/756 |
| 4,745,810 | 5/1988 | Pierce et al. | 73/706 |
| 4,932,269 | 6/1990 | Cammarata, III et al. | 73/861.61 |
| 5,036,711 | 8/1991 | Good | 73/861.66 |
| 5,085,250 | 2/1992 | Kendrick | 138/44 |
| 5,773,726 | 6/1998 | Mahoney et al. | 73/861.65 |
| 5,817,950 | 10/1998 | Wiklund et al. | 73/861.66 |

FOREIGN PATENT DOCUMENTS

| | | |
|---|---|---|
| 0 686 831 | 12/1995 | (DE) . |
| 0 887 626 A1 | 6/1998 | (EP) . |
| 1467957 | 3/1977 | (GB) . |
| 2 301 676 | 12/1996 | (GB) . |
| 57-198823 | 12/1982 | (JP) . |
| 4-225126 | 8/1992 | (JP) . |
| 6-213694 | 1/1994 | (JP) . |

OTHER PUBLICATIONS

U.S. application No. 09/395,688, Kleven, filed Sep. 13, 1999.
Model 8800A Vortex Flowmeter, Key Differentiators (undated).
Model 1195 Integral Orifice Assembly, Rosemount Catalog pages Flow–125—Flow 137 (Published 1995), (No mo.).
Model 8800 Smart Vortex Flowmeter, Fisher–Rosemount, Managing the Process Better, pp. 2–19, (1994), (No. mo).
Model 8800A Smart Vortex Flowmeter, Fisher–Rosemount, Managing the Process Better, pp. 2–21 (1997), (No. mo.).
Process Instrument Engineers Handbook, Revised Edition, Chapters 2.10, 2.11, and 2.12, pp. 87–110 (1982), (No. mo.).

*Primary Examiner*—William Oen

(57) ABSTRACT

A flow device including a differential flow plate insertable into a flow path between pipe sections including a flow conduit supporting a flow interrupter and differential pressure taps. The flow conduit including a seamless interface between the flow interrupter and the pressure taps to reduce non-attributable pressure loss between differential pressure taps as well as reduce field installation labor including that of pressure testing the various pressure couplings.

16 Claims, 13 Drawing Sheets

PROCESS FLOW DEVICE WITH IMPROVED PRESSURE MEASUREMENT FEATURE

CROSS-REFERENCE TO RELATED APPLICATION

Reference id hereby made to co-pending application Ser. No. 09/395,688, filed Sep. 13, 1999 and entitled "PROCESS FLOW PLATE WITH HIGH ACCURACY TEMPERATURE FEATURE".

BACKGROUND OF THE INVENTION

The invention relates to the process measurement and control industry. The measurement and control industry employs process variable transmitters to remotely monitor process variables associated with fluids such as slurries, liquids, vapors, gasses, chemicals, pulp, petroleum, pharmaceuticals, food and other food processing plants. Process variables include pressure, temperature, flow, level, turbidity, density, concentration, chemical composition and other properties.

FIG. 1 is an exploded view of a prior art process flow device 50 for measuring process variables, such as differential pressure and flow. As shown in FIG. 1, flow plate 52 is clamped between flanges 54, 56 in a flow path to produce a differential pressure across a constriction for measuring flow rate of fluids through a pipe 58. Differential pressure across the flow constriction is measured at pressure taps 60, 62. As illustrated in FIGS. 1–2, pressure taps 60, 62 are separate from flow plate 52 clamped between pipe flanges 54, 56 so that seams separate pressure taps 60, 62 from flow plate 52. Pipe 58 conveys process fluid at a high pressure. Such pressure is a combination of the differential pressure developed in response to the constriction and the static pressure within the pipe which can be 1000 psi or more. The high pressure can cause fluid and pressure to leak from seams between the flow plate 52 and pressure taps 60, 62. Vibration and other motion of the flow pipe can loosen the connection between the flow plate 52 and pressure taps 60, 62 contributing to fluid and pressure leakage at the seams.

Within device 50, flow rate is calculated based upon differential pressure across a flow constriction, pipe diameter and constriction profile. Pressure loss and leakage at seams changes the measured differential pressure across the flow constriction and the pressure loss or change is not attributable to flow rate. The non-attributable pressure loss at the seams degrades flow calculations. Additionally, device 50 requires significant field installation time due to the necessity of joining all the couplings together and performing leak checking upon the couplings. Moreover, whenever maintenance is required for device 50, significant disassembly/reassembly time is usually required which increases undesirable downtime. Thus, it is desirable to provide a process fluid flow measurement device with increased accuracy and reduced field installation time, downtime, and cost.

SUMMARY

Embodiments of the invention relate to a flow plate having a seamless interface between first and second pressure taps and flow interrupter to reduce non-attributable pressure loss at seams between first and second pressure taps and the flow interrupter. Reduced non-attributable pressure loss improves measurement accuracy, while the seamless interface reduces field installation time.

DETAILED DESCRIPTION

Figure 1:
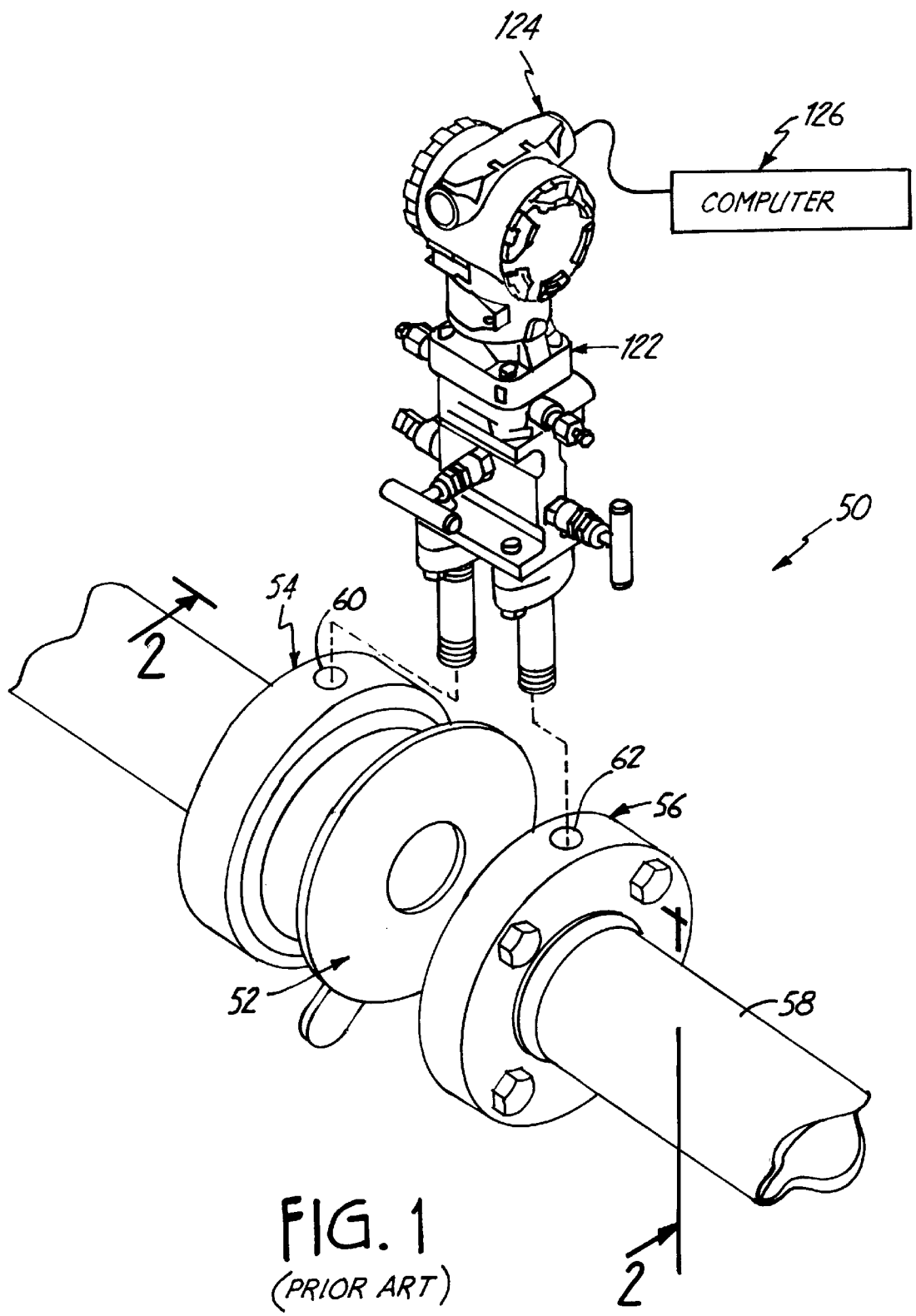
FIG. 1 is an exploded perspective view of a prior art flow plate inserted between pipe flanges.
Figure 2:
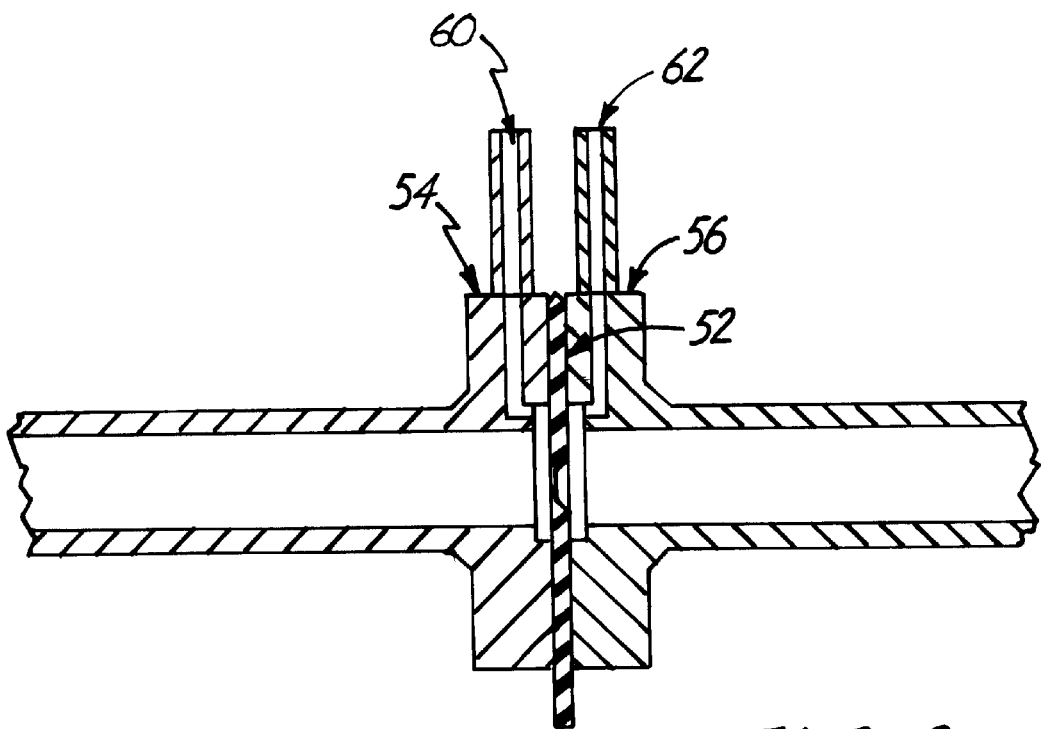
FIG. 2 is a cross-sectional view taken along line 2—2 of FIG. 1.
Figure 3:
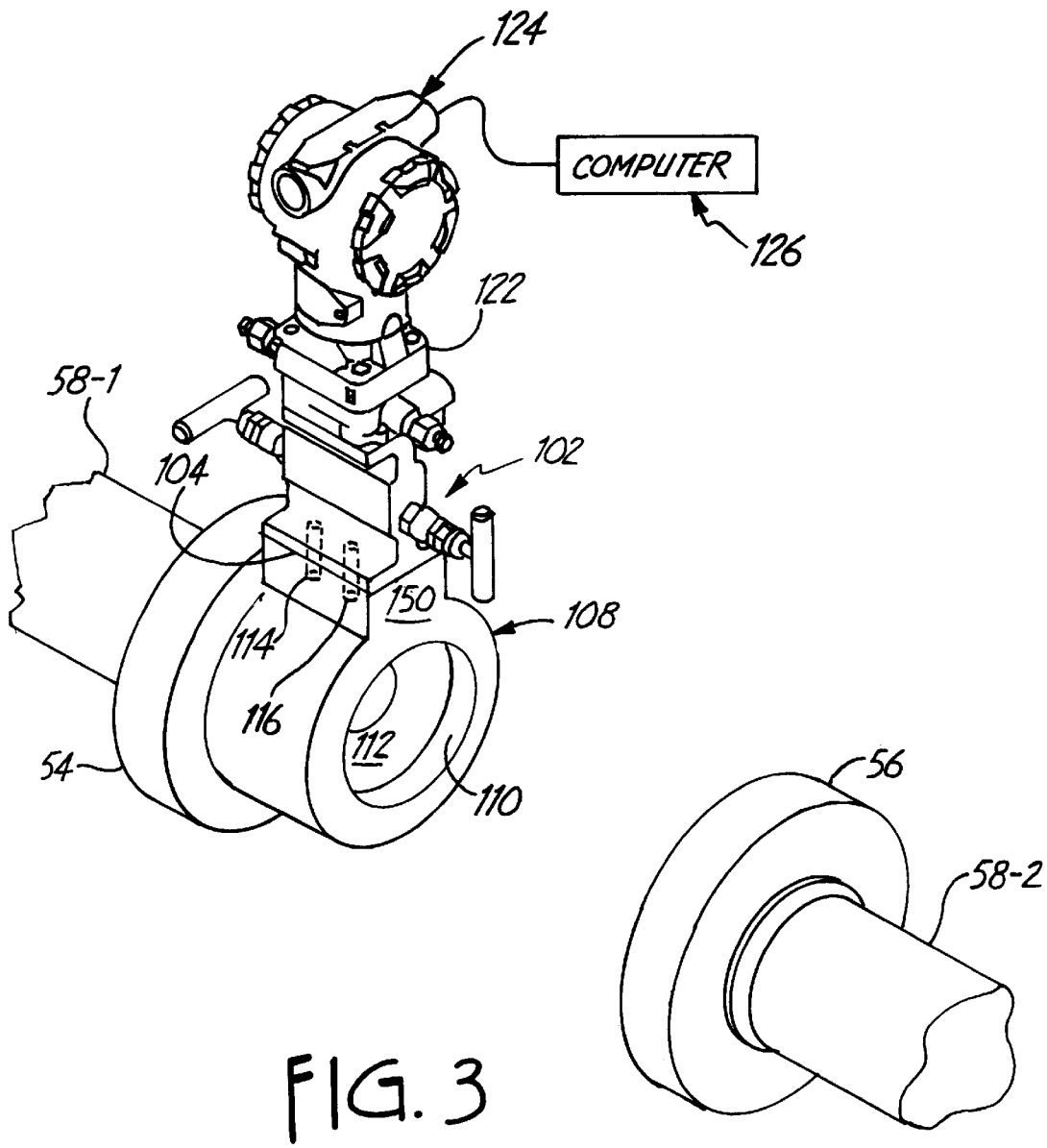
FIG. 3 is an environmental view of an embodiment of a process flow device of the present invention.
Figure 4:
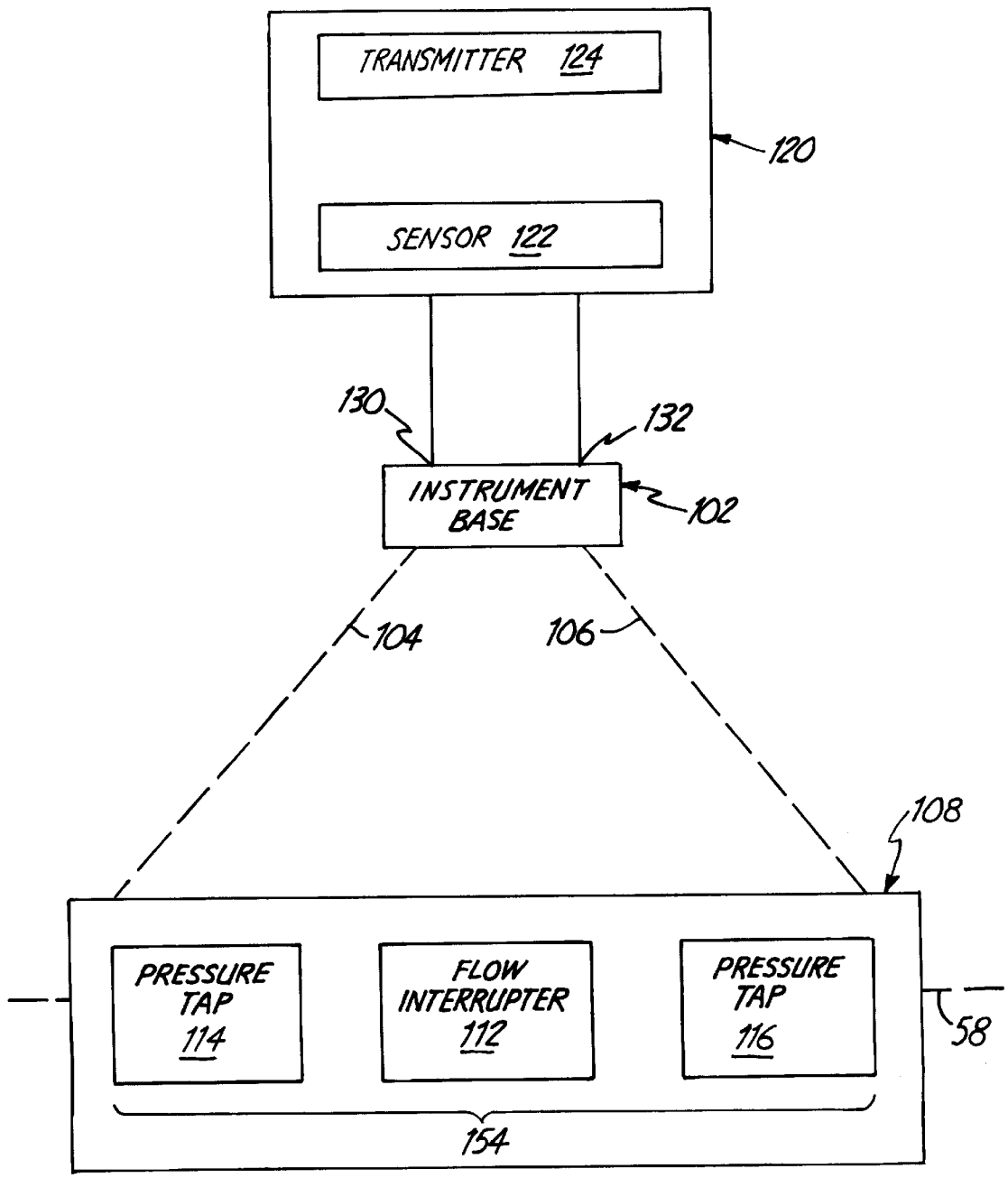
FIG. 4 is a schematic illustration of components of a process flow device of the present invention.

FIGS. 3–4 are environment illustrations of an embodiment of a process flow device 100 of the present invention including an instrument base 102, first and second different pressure passageways 104, 106 and a differential flow plate 108. The differential flow plate 108 includes a flow conduit 110 supporting a flow interrupter 112 and first and second pressure taps 114, 116 open to the flow conduit 110 (illustrated schematically in FIG. 4).

As shown schematically in FIG. 4, instrument base 102 supports process instrumentation 120. In FIGS. 3–5 and 7, process instrumentation 120 includes a pressure sensor module 122 for isolating a differential pressure and transmitter 124 for transmitting process data to a computer or reading device 126 (FIG. 3). Transmitter 124, or any other any other appropriate readout device, can sense process variables and provide a related output over a process loop to a control room or computer 126, such that the process can be monitored and controlled. Computer 126 can be remote or locally integrated. The process loop can be a two-wire 4–20 mA process control loop. The loop may also have digital signals superimposed on the two-wire loop according to a process industry standard protocol such as the HART® ("Highway Addressable Remote Transducer") digital protocol, as described in HART® Communication Foundation, Austin, Tex. 78759-6450. Local process control devices are connected to process control, for example, through a fieldbus interface and network system as described in "Fieldbus Technical Overview" Fisher-Rosemount Systems, Inc., Eden Prairie, Minn. Process transmitters 124 can also be configured to meet intrinsic safety requirements.

Figure 5:
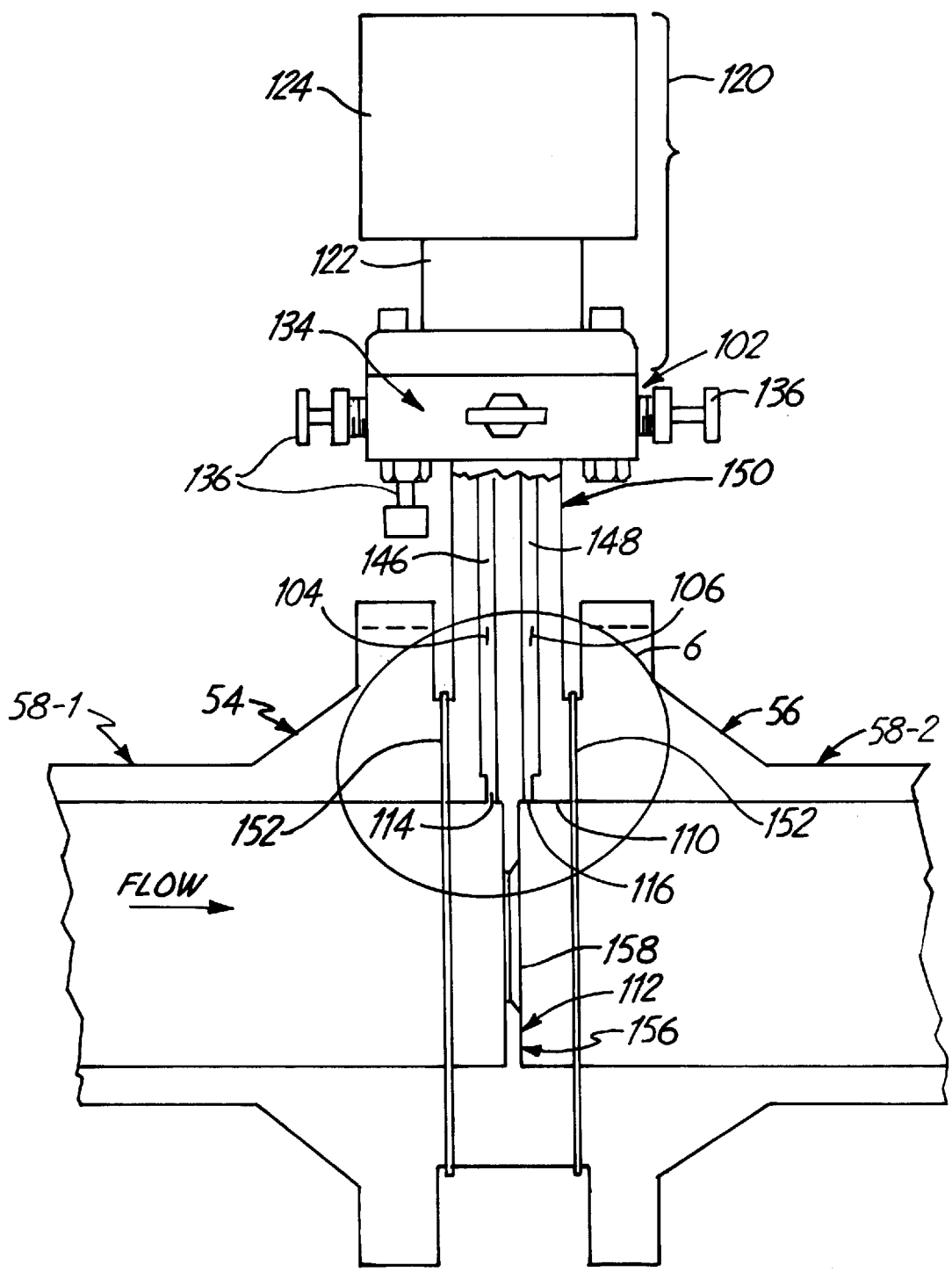
FIG. 5 is a cross-sectional view of an embodiment of a process flow device assembled in a flow pipe between flanges.
Figure 7:
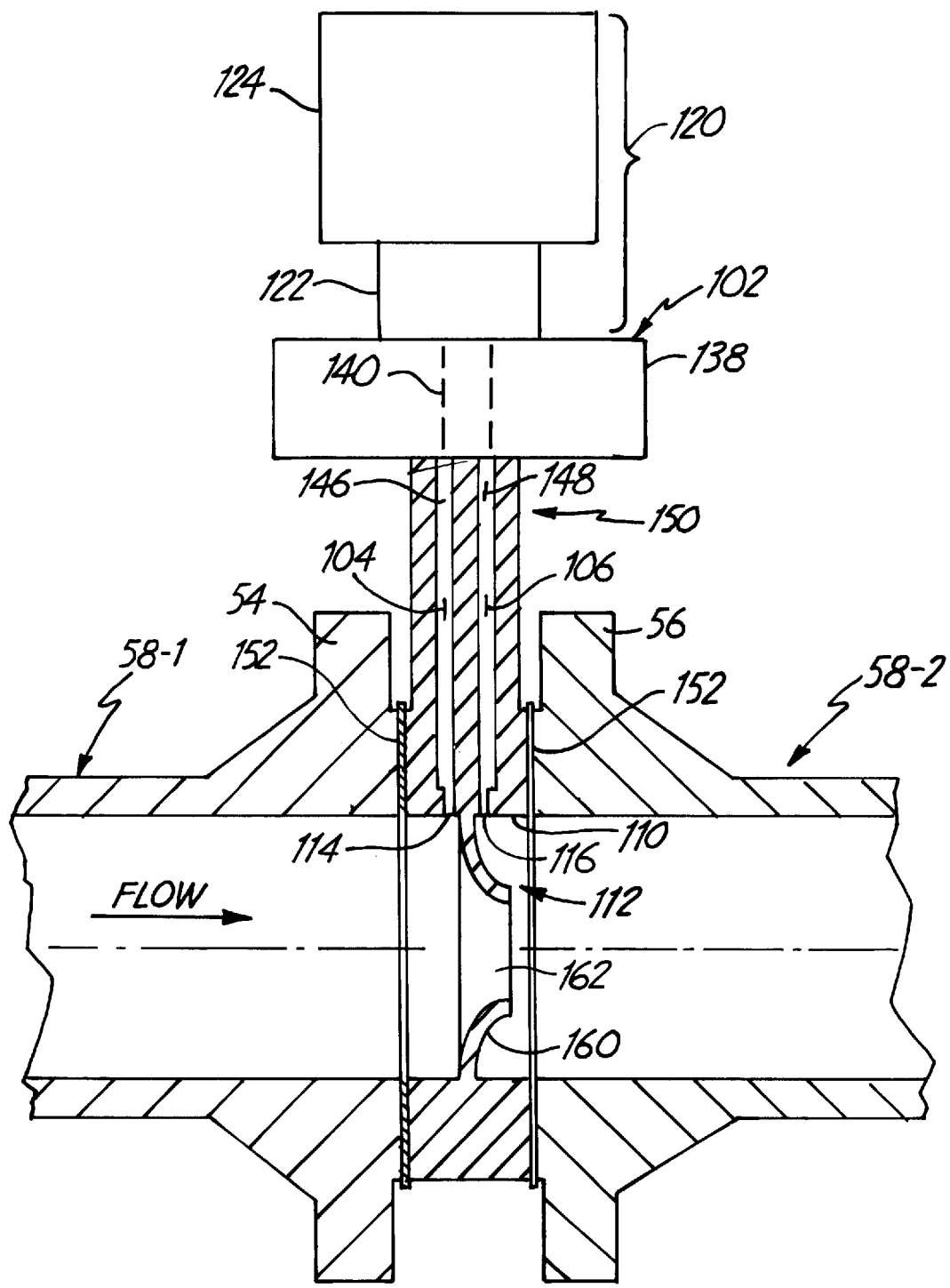
FIG. 7 is a cross-sectional view of an alternate embodiment of a process flow device assembled in a flow pipe between flanges.

Instrument base 102 includes first and second differential pressure openings 130, 132 as shown in FIG. 4. Instrument base 102 supports process instrumentation 120 for fluid connection to differential pressure passageways 104, 106. FIG. 5 illustrates an embodiment of instrument base 102 that includes a manifold 134. Although not necessary for embodiments of the invention, manifold 134 provides calibration and maintenance convenience. Manifold 134 includes valve ports 136 to selectively obstruct or permit flow through the manifold during maintenance. Pressure passageways 104, 106 are in fluid communication with manifold channels. Although three valve ports are shown, any appropriate number of valve ports 136 can be used. In FIG. 7, instrument base 102 includes a base flange 138 illustrated diagrammatically having pressure channels 140, 142 extending through flange 138 and opened to pressure passageways 104, 106.

Pressure passageways 104, 106 fluidly couple pressure openings 130, 132 of the instrument base 102 to pressure taps 114, 116. In FIGS. 5 and 7, pressure passageways 104, 106 are formed by coaxial channels 146, 148 in a solid stem 150. Channels 146, 148 formed through stem 150 are straight for rodding the passageways for cleaning. In an alternative design, tubes can be used to form passageways 104, 106 and application is not limited to the solid stem 150 shown in FIGS. 5 and 7. Stem 150 can be bolted to instrument base 102 as illustrated in FIG. 3 or connected by other fasteners.

In FIG. 5, manifold 134 can be permanently connected to stem 150 to provide a permanent interface between stem 150 and manifold 134. A permanent interface reduces leakage at the interface of the stem 150 and manifold 134 due to assembly and disassembly.

Differential flow plate is coupleable between pipe sections 58-1, 58-2. In FIGS. 5 and 7, a sealing gasket 152 abuts a sealing surface of flow plate 108 and flanges 54, 56. Flow conduit 110 supports flow interrupter 112 to separate flow conduit into two sides. Flow conduit 110 is seamless between flow interrupter 110 and first and second pressure taps 114, 116 to provide a seamless interface 154 (as schematically illustrated in FIG. 4) in flow conduit 110 between flow interrupter 112 and first and second pressure taps 114, 116. Thus, the seams separating prior art flow plates from pressure taps as described in the Background of the Invention are eliminated. Elimination of the seams between the flow interrupter 110 and pressure taps 114, 116 limits non-attributable pressure loss at the seams which can degrade flow measurement. Additionally, such configuration reduces the likelihood of leak development and the associated undesirable fugitive emissions. Further, elimination of the seams reduces field installation time and cost because fewer seals need to be created and tested in the field.

In FIGS. 5 and 7, flow plate 108 is formed integrally with stem 150 to form a single assembly unit. The single assembly unit reduces connections between pressure taps 114, 116 and pressure openings 130, 132 to reduce non-attributable pressure loss.

Flow interrupter 112 can be an orifice plate 156 having a constricted flow orifice 158 as illustrated in FIG. 5. Although a conical edge concentric orifice plate 156 is shown in FIG. 5, other orifice plates can be used. Flow interrupter 112 can be a nozzle plate 160 having a constricted nozzle opening 162 as illustrated in FIG. 7. Detailed descriptions of various orifice plates and nozzle plates are described in Liptak, Beto, *Instrument Engineer's Handbook: Process Measurement and Analysis*, 3rd. Ed., Chilton Book Company (1995) and Miller, Richard, *Flow Measurement Engineering Handbook*, 3rd Ed., McGraw-Hill, Inc. (1996).

Figure 8:
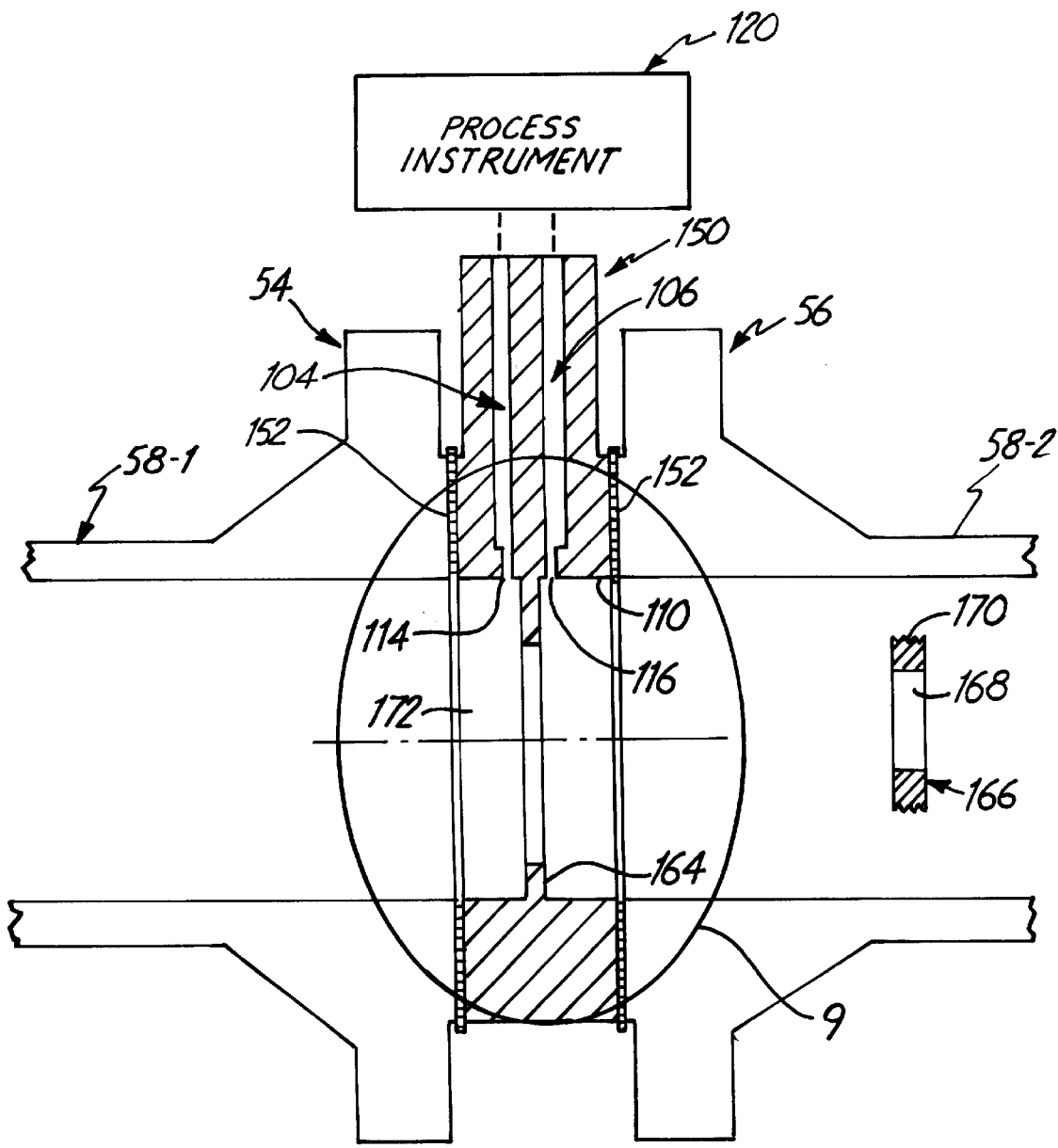
FIG. 8 is a cross-sectional view of an alternate embodiment of a process flow device assembled between pipe flanges having a detachable edge portion.
Figure 9:
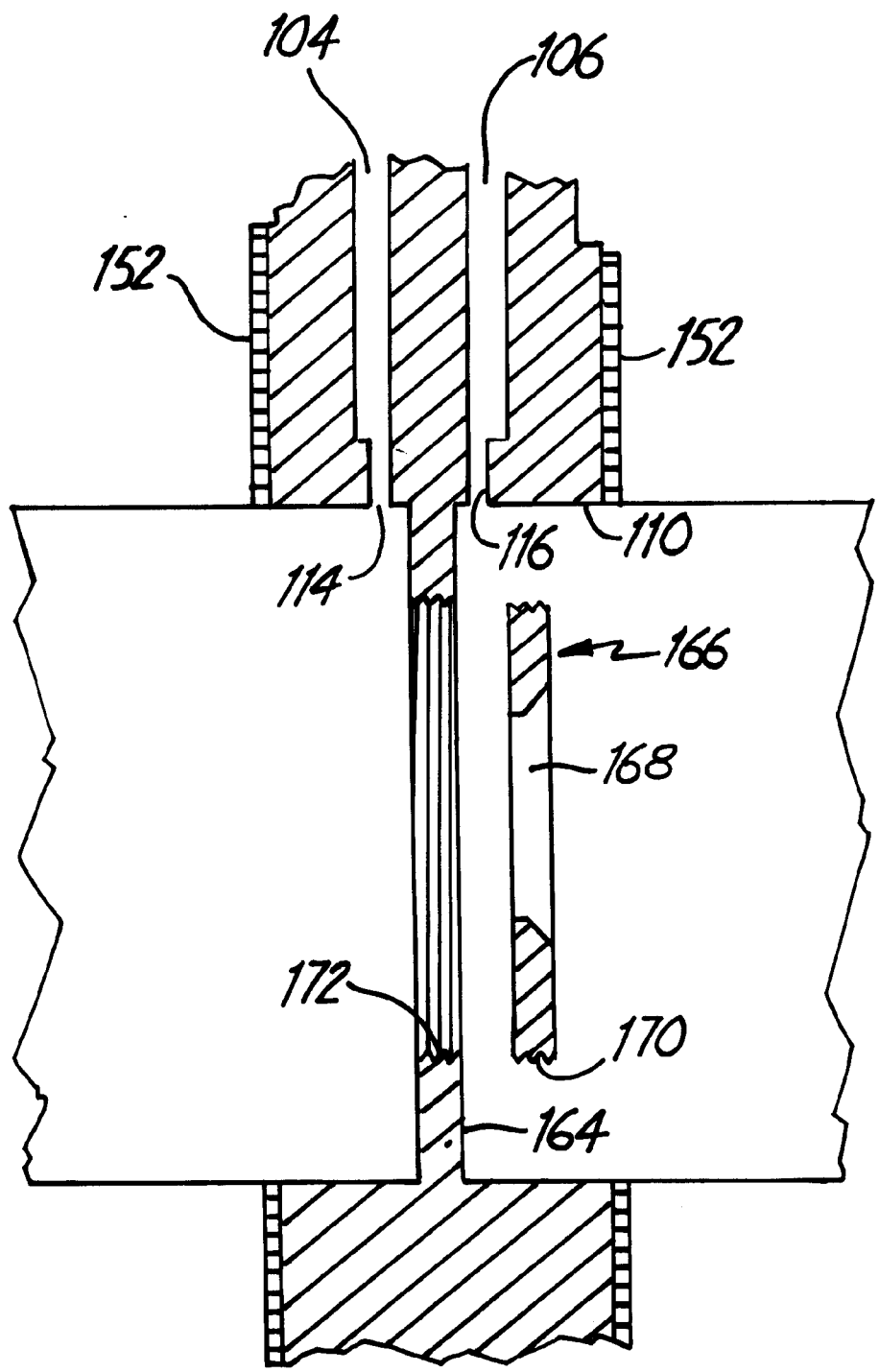
FIG. 9 is a detailed illustration of portion 9 of FIG. 8.

FIGS. 8–9 illustrate a flow interrupter 112 having a base portion 164 and a removable edge portion 166 including constricted flow passage 168. Base portion 164 is integral with flow plate 108 and the edge portion 166 is removably coupleable (as illustrated) to the base portion 164. When edge portion 166 wears, a new edge portion 166 is installed for continued use of the flow plate 108, which extends the useful operating life of the flow plate 108. In the embodiment illustrated in FIGS. 8–9, edge portion 166 is externally threaded 170 to mate with internal threads 170 on the base portion 164. A mechanism to lock and seal plate 108 (not shown) is desirable to prevent the insert from dropping and/or falling out. Although a cooperating thread arrangement is shown for removably connecting base portion 164 and edge portion 166, alternate coupling methods can be used employing, for example, screws, bolts, etc.

Differential pressure taps 114, 116 are in fluid communication with flow conduit 110. The first pressure tap 114 is opened to the flow conduit 110 on a first side of the flow interrupter 112 and is in communication with the first differential pressure opening 130 through the first differential pressure passageway 104 as schematically illustrated in FIG. 4. The second pressure tap 116 is opened to the flow conduit 110 on an opposite side of the flow interrupter 112 and in communication with the second differential pressure opening 132 through the second differential passageway 106.

In FIGS. 5, 6, 7 and 8, pressure taps 114, 116 are formed of a hole in flow conduit 110 on opposed sides of the flow interrupter 112. In FIGS. 10–13, pressure taps 114, 116 include annular pressure channels 174, 176 extending about a perimeter of flow conduit 110 and in fluid communication with flow conduit 110, on opposed sides of flow interrupter 112, and differential pressure passageways 104, 106 to provide an average pressure measurement upstream and downstream of the flow interrupter 112.

Figure 10:
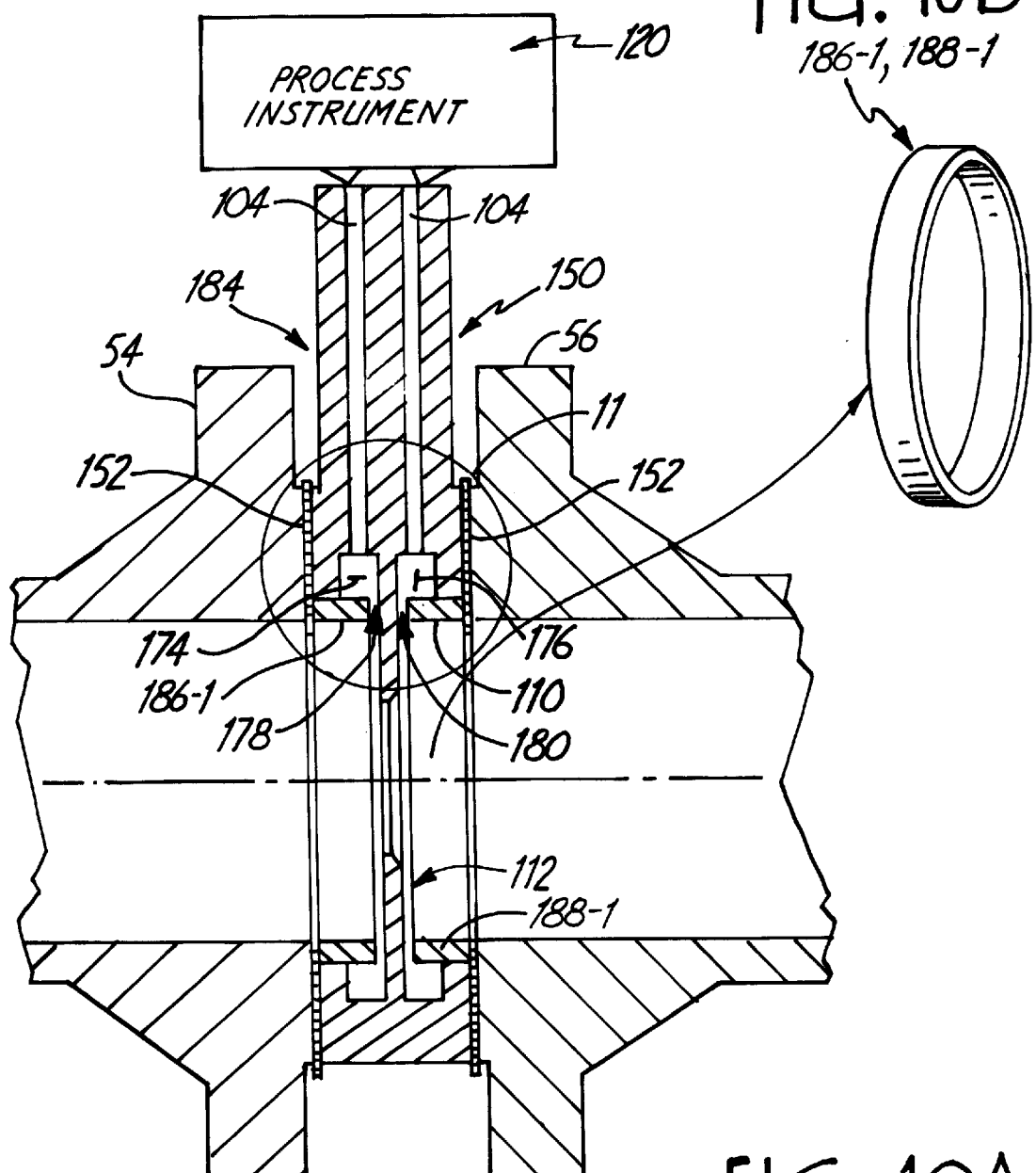
FIG. 10 is a cross-sectional view of an alternate embodiment of a process flow device assembled between pipe flanges with exploded illustration of rings forming a conduit of the flow plate.
Figure 11:
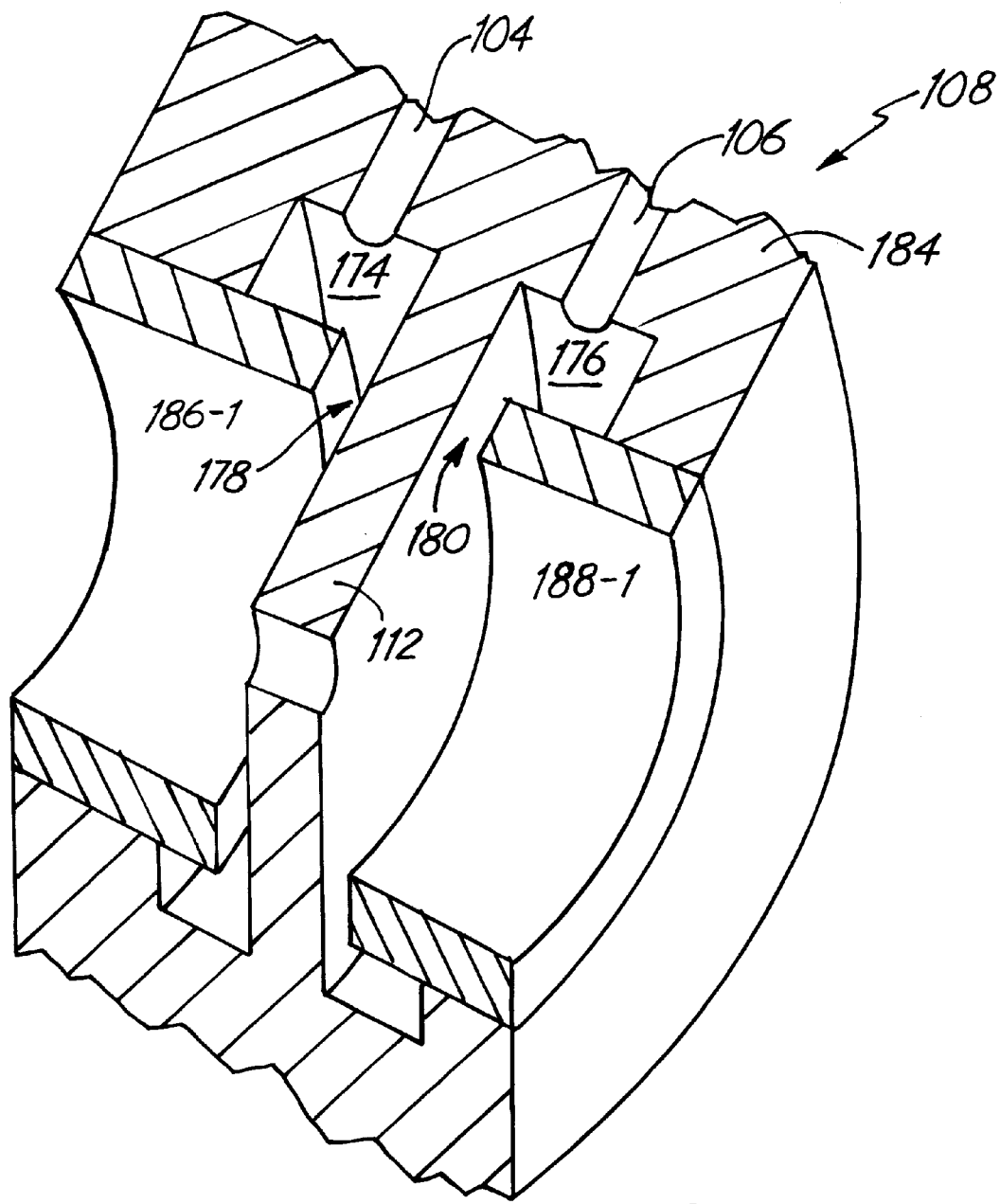
FIG. 11 is a perspective illustration of portion 11 of the flow plate of FIG. 10
Figure 12A:
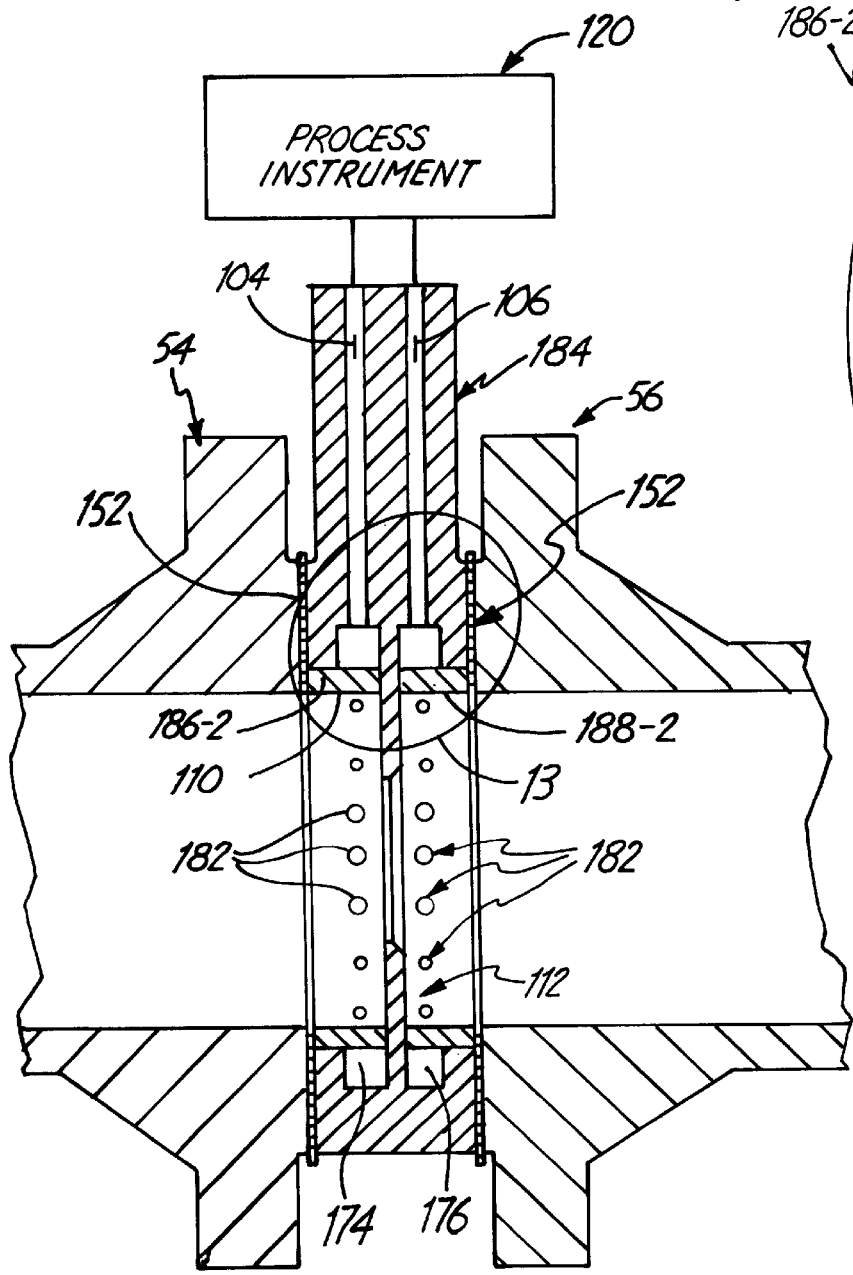
FIG. 12 is a cross-sectional view of an embodiment of a process flow device assembled between pipe flanges with exploded illustration of an alternate embodiment of rings forming a conduit of the flow plate.
Figure 12B:
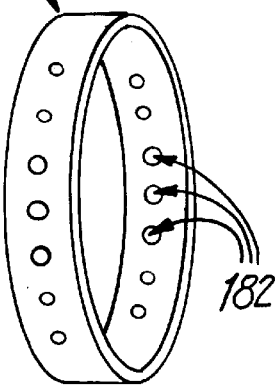
Figure 13:
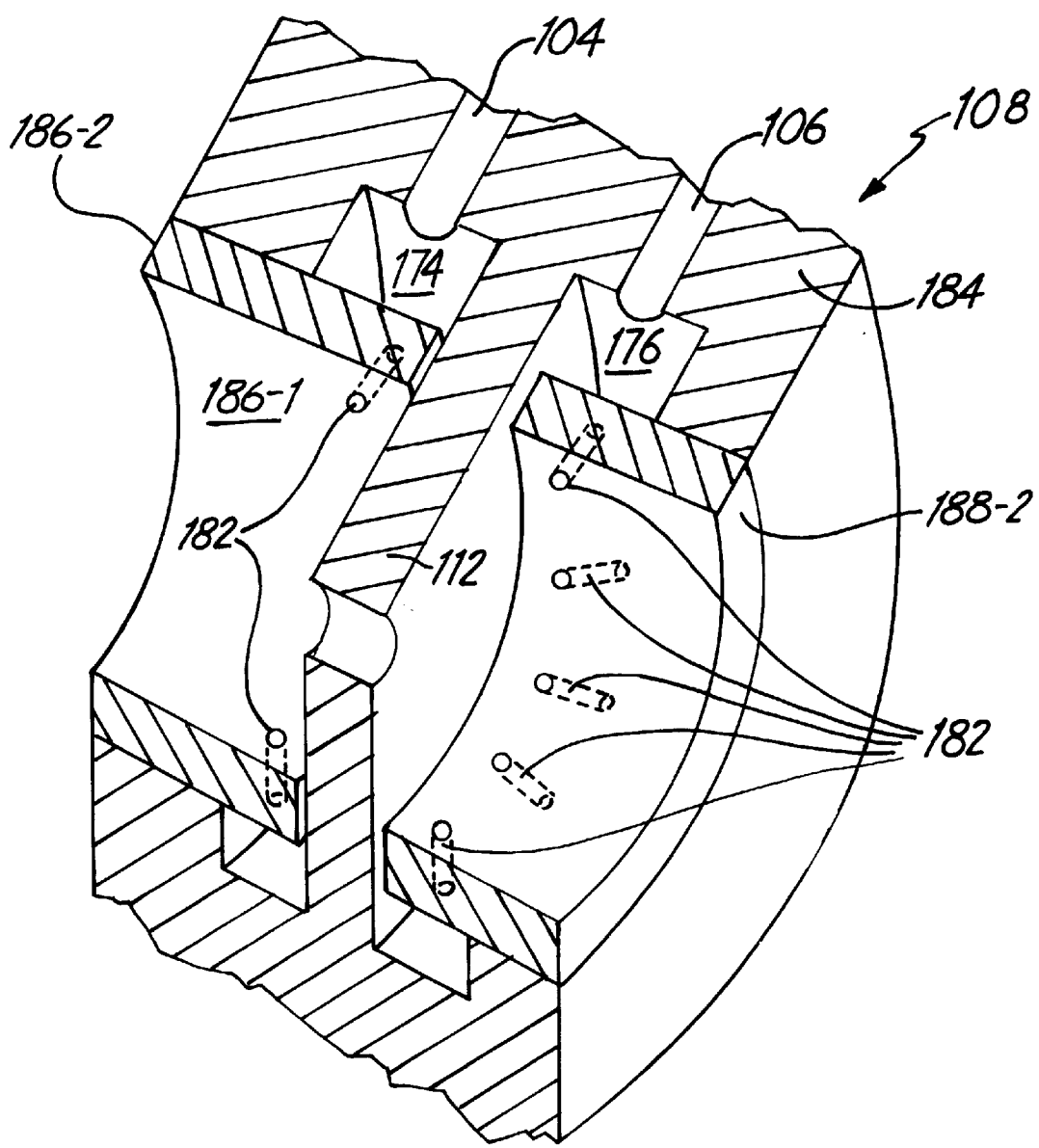
FIG. 13 is a perspective illustration of portion 13 of the flow plate of FIG. 12.

In FIGS. 10–11, an annular openings 178, 180 extend about the perimeter of conduit 110 on opposed sides of flow interrupter 112. Openings 178, 180 fluidly couple flow conduit 110 to annular pressure channels 174, 176, respectively. In FIGS. 12 and 13, a plurality of openings 182 are spaced about the perimeter of conduit 110 on opposed sides of the flow interrupter 112. Openings 182 fluidly couple flow conduit 110 and annular pressure channels 174, 176 for pressure measurement. Openings 182 can be any suitable shape including holes, slots, and semicircles.

Figure 6:
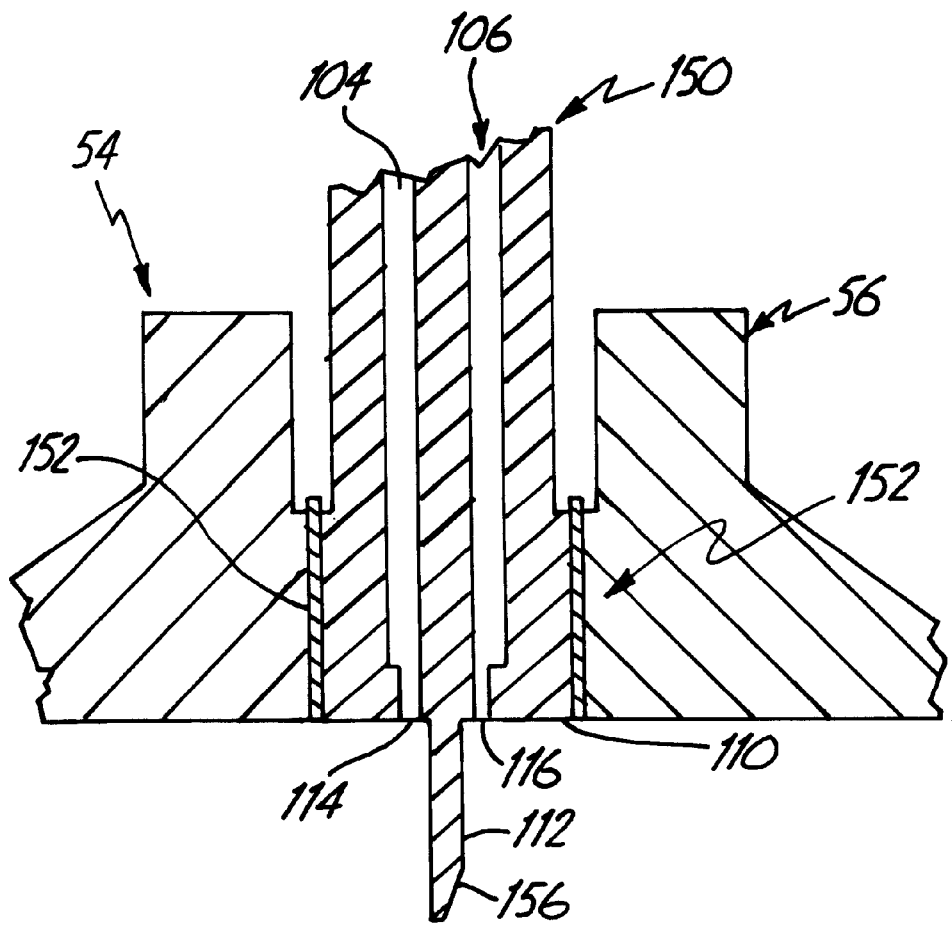
FIG. 6 is a detailed illustration of portion 6 of FIG. 5.

In FIGS. 5–7, flow plate 108 is formed of a unitary construction. In FIGS. 10–13, flow plate 108 is constructed of an outer block 184 and inner rings 186, 188. Outer block 184 includes flow interrupter 112 extending into a central opening of outer block 184. Rings 186, 188 are sized for insertion into central opening of outer block 184 on opposed sides of flow interrupter 112 to form conduit wall 110. The inner diameter of rings 186, 188 can vary for sizing the flow plate 108 for various pipe inside diameters. In one embodiment, rings 186, 188 are welded to outer block 184 to provide a relatively fluid-tight connection for conduit walls 110, although other connections can be used.

In FIGS. 10–11, edges of the rings 186-1, 188-1 are spaced from flow interrupter 112 to form the annular openings 178, 180 extending about the perimeter of the flow conduit 110 to fluidly couple conduit 110 to pressure channels 174, 176. In FIGS. 12 and 13, rings 186-2, 188-2 include openings 182 extending about the perimeter of rings 186-2, 188-2 to fluidly couple conduit 110 and annular pressure channels 174, 176.

Flow plate 108 is inserted into flowpath for process measurement and control. Flow through pipe 54 creates a differential pressure across flow interrupter 112. Differential pressure across flow interrupter 112 is conveyed by first and second pressure taps 114, 116 on opposed sides of the flow interrupter 112 to process instrumentation 120 to measure differential pressure across first and second pressure taps 114, 116 and transmit measurement data to a computer 126. Flow conduit 110 of flow plate 108 supporting flow interrupter 112 is seamless and includes pressure taps 114, 116 to provide a seamless interface between pressure taps 114, 116 and flow interrupter 112 for pressure measurement as previously described.

Although the present invention has been described with reference to preferred embodiments, workers skilled in the art will recognize that changes may be made in form and detail without departing from the spirit and scope of the invention.

What is claimed is:

1. A process flow device comprising:
   an instrument base coupleable to process instrumentation, the instrument base including first and second differential pressure openings;
   first and second differential pressure passageways coupled to the instrument base and in communication with the first and second differential pressure openings;
   a differential flow plate coupleable between pipe connections, the differential flow plate including:
      a flow conduit supporting a flow interrupter that separates the flow conduit into two sides;
      a first pressure tap opened to the flow conduit on a first side of the flow interrupter and in fluid communication with the first differential pressure opening through the first pressure passageway;
      a second pressure tap opened to the flow conduit on an opposite side of the flow interrupter and in fluid communication with the second differential pressure opening through the second pressure passageway; and
      wherein the flow conduit is seamless between the flow interrupter and first and second pressure taps.

2. The process flow device of claim 1 wherein the instrument base includes a manifold.

3. The process flow device of claim 1 wherein the instrument base includes a base flange.

4. The process flow device of claim 1 including a transmitter coupled to the instrument base.

5. The process flow device of claim 1 including a pressure sensor coupled to the instrument base.

6. The process flow device of claim 1 wherein the first and second differential pressure passageways are relatively straight.

7. The process flow device of claim 1 including a stem having at least two channels extending through the stem to form first and second differential pressure passageways in communication with differential pressure openings and pressure taps.

8. The process flow device of claim 7 wherein the flow interrupter and stem are formed in a single unit.

9. The process flow device of claim 1 wherein the flow interrupter is selected from the group consisting of an orifice plate having a constricted orifice and a nozzle plate having a constricted nozzle opening.

10. The process flow device of claim 1 wherein an edge portion of the flow interrupter is removably coupleable to a base portion of the flow interrupter.

11. The process flow device of claim 1 wherein the first and second pressure taps include annular pressure channels.

12. The process flow device of claim 11 wherein the differential pressure taps include an annular opening in communication with the annular pressure channels.

13. The process flow device of claim 11 wherein the differential pressure taps include a plurality of concentrically spaced openings in communication with the annular pressure channels.

14. The process flow device of claim 1 wherein the differential flow plate includes an outer block and inner rings, the outer block includes the flow interrupter extending into a central opening of the outer block and the rings are sized for insertion within the central opening of the outer block to form the flow conduit.

15. The process flow device of claim 1 wherein the differential flow plate includes flangeless sealing surfaces for connection between pipe flanges.

16. A process flow device comprising:
   means for supporting a process instrumentation;
   means for producing a differential pressure in a flow path;
   first means for conveying a first differential pressure to process instrumentation;
   second means for conveying a second differential pressure to process instrumentation; and
   means for seamlessly connecting the means for producing a differential pressure and the first and second means for conveying differential pressure to limit pressure loss.

* * * * *

UNITED STATES PATENT AND TRADEMARK OFFICE
CERTIFICATE OF CORRECTION

PATENT NO. : 6,311,568 B1  Page 1 of 1
DATED : November 6, 2001
INVENTOR(S) : Kleven It is certified that error appears in the above-identified patent and that said Letters Patent is hereby corrected as shown below:

<u>Title page,</u>
Item [73], Assignee, replace "Rosemount, Inc." with -- Rosemount, Inc. --
Item [56], References Cited, U.S. PATENT DOCUMENTS add
-- 5,469,749    11/1995      Shimada et al. ………...73/861.47 --

<u>Column 1,</u>
Line 5, replad "id" with -- is --.

Signed and Sealed this

Sixth Day of August, 2002

*Attest:*

JAMES E. ROGAN
*Attesting Officer*    *Director of the United States Patent and Trademark Office*

UNITED STATES PATENT AND TRADEMARK OFFICE
CERTIFICATE OF CORRECTION

| | | |
|---|---|---|
| PATENT NO. | : 6,311,568 B1 | Page 1 of 1 |
| APPLICATION NO. | : 09/394728 | |
| DATED | : November 6, 2001 | |
| INVENTOR(S) | : Lowell Kleven | |

It is certified that error appears in the above-identified patent and that said Letters Patent is hereby corrected as shown below:

Title Page; item (56);
In Foreign Patent Documents, please delete "0 686 831   12/1995   (DE) ." and insert --0 686 831   12/1995   EP--

Signed and Sealed this

Seventh Day of July, 2009

JOHN DOLL
*Acting Director of the United States Patent and Trademark Office*